United States Patent [19]

Raghunath

[11] Patent Number: 6,060,936
[45] Date of Patent: May 9, 2000

[54] CIRCUIT AND METHOD FOR PERFORMING A DIVIDE OPERATION WITH A MULTIPLIER

[75] Inventor: Kalavai J. Raghunath, Chatham, N.J.

[73] Assignee: Lucent Technologies Inc., Murray Hill, N.J.

[21] Appl. No.: 09/097,314

[22] Filed: Jun. 12, 1998

[51] Int. Cl.[7] ............................................ G06F 7/38
[52] U.S. Cl. .................. 327/360; 327/356; 708/650; 708/651
[58] Field of Search ................... 708/7, 103, 650, 708/651, 652, 844; 327/360, 356

[56] References Cited

U.S. PATENT DOCUMENTS

| 5,255,213 | 10/1993 | Wasserman | 708/103 |
| 5,416,733 | 5/1995 | Chen et al. | 708/650 |
| 5,424,965 | 6/1995 | Shou et al. | 708/7 |

OTHER PUBLICATIONS

Koren, Israel, "Array Dividers", *Computer Arithmetic Algorithms*, Sec. 7.4, pp. 145–146.

*Primary Examiner*—Tuan T. Lam

[57] ABSTRACT

A divider circuit provides a divide operation with a multiplier, counter and comparator. The divide operation of two values, x and y, to produce the value of x divided by y, x/y, is provided by sequentially multiplying y in the multiplier with values from the counter until the product of y and a current counter value is determined to cross a unity level, or "1," as determined by a comparator. Therefore, the current value in the counter is approximately equal to 1/y. Then, the determined value of 1/y is multiplied by x to provide x/y. A preferred embodiment of the divider circuit employs a single multiplier, and the divide circuit includes a mux, a multiplier, a counter, a comparator, and an optional buffer. The mux receives two values x and y and a selection signal provided by the comparator. The counter is loaded with an initial value, which may be a zero dataword. The selection signal of the comparator initially causes the mux to provide the value of y, the optional buffer to provide a null output value, and the counter to be enabled. The counter provides sequential counter values in accordance with transitions of a counter clock. When the counter value corresponds to 1/y, the selection signal of the comparator changes state, freezing the value in the counter and causing the mux to provide the value of x. Consequently, the frozen value of the counter is multiplied with x to provide x/y. The optional buffer receives the output of the multiplier and may also be enabled by the selection signal having the changed state and an external control signal.

18 Claims, 3 Drawing Sheets

CIRCUIT AND METHOD FOR PERFORMING A DIVIDE OPERATION WITH A MULTIPLIER

BACKGROUND OF THE INVENTION

1. Field of the Invention

The present invention relates to circuits for performing divide operations.

2. Description of the Related Art

Many applications require a circuit designer to implement a mathematical algorithm or evaluate a mathematical equation. Most operations of these algorithms may be performed by circuits which perform the simple operations of add, subtract, multiply and divide. Addition and subtraction are the simplest operations; signals may be simply combined in an adder implemented with, for example, a unity gain amplifier in the analog domain and counters or shift registers in the digital domain. A subtract operation is usually performed by an adder in either the analog or digital domain which complements the signal to be subtracted. A multiply operation by a multiplier is also easily implemented, either through transistor/diode circuits in the analog domain or by counters and shift registers in the digital domain. A divide operation, however, is more difficult to implement. FIG. 1A shows a divider circuit of the prior art, known as an array divider, and FIG. 1B illustrates a controlled add/subtract cell (CAS) of the array divider of FIG. 1A. A typical divider circuit of the prior art may implement a sequential partial remainder algorithm using an array of add/subtract cells. In FIG. 1A, $x_0, x_1, \ldots, x_6$ are the bit values of the dividend, $d_0, d_1, d_2, d_3$ are the bit values of the divisor, $q_0, q_1, q_2, q_3$ are the bit values of the quotient, and $r_0, r_1, r_2, r_3$ are the bit values of the remainder. As shown in FIGS. 1A and 1B, a divider circuit is quite complex. Further, typical applications are now often implemented in an integrated circuit (IC), and the IC usually has many large arrays of multipliers at various locations on the IC already available to the circuit designer as a consequence of the overall IC design process. Also, these multiplier designs are available to the circuit designer in an IC design library. A divider, on the other hand, is difficult to implement on an IC, and is not generally available to the circuit designer without specifically designing the divider at a particular location on the IC. Such design also tends to require more IC real estate than the multiplier circuits.

SUMMARY OF THE INVENTION

The present invention relates to circuit and method providing a divide operation for values x and y employing at least one multiplier. In accordance with the present invention, a sequence of counter values is provided, each of the sequence of counter values being multiplied with the value y to provide a respective product value, and then comparing each product value with a unity threshold level. A current counter value is set when the product value, which is approximately the inverse of y, crosses the unity threshold level, and x is multiplied by the current counter value to provide a value of x divided by y.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the invention, a circuit provides a divide operation of two values, x and y, to produce the value of x divided by y (x/y). The circuit sequentially multiplies y with values from a counter until the product of y and a current counter value crosses a unity level, which may be a crossing of a "1" threshold level. Then, the determined value of the counter, either before or after crossing the unity level and approximately equal to the inverse of y (1/y), is multiplied by x to provide x/y.

Figure 1A:
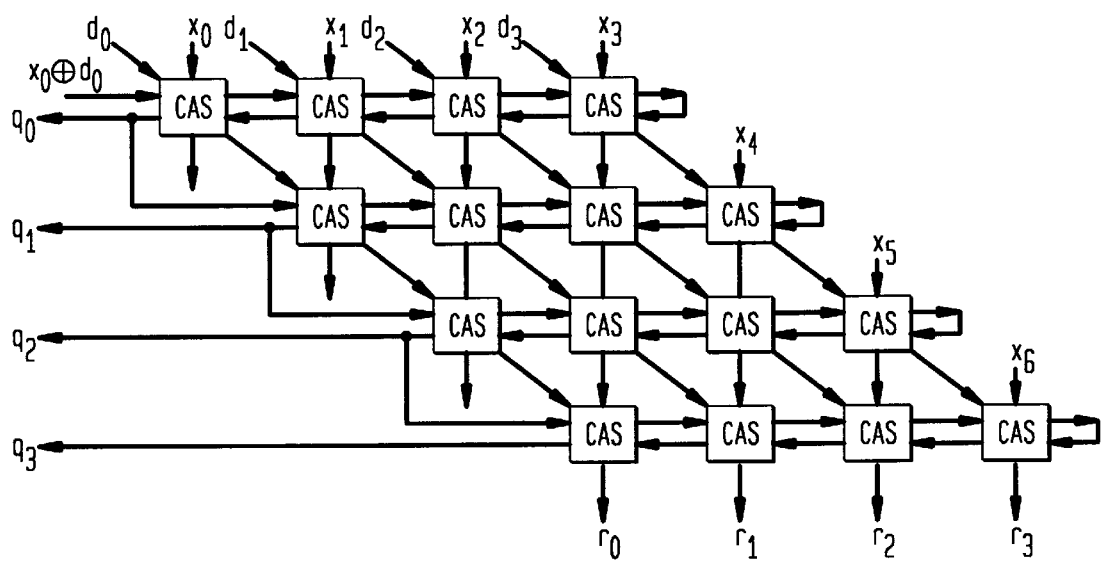
FIG. 1A shows a divider circuit of the prior art.
Figure 1B:
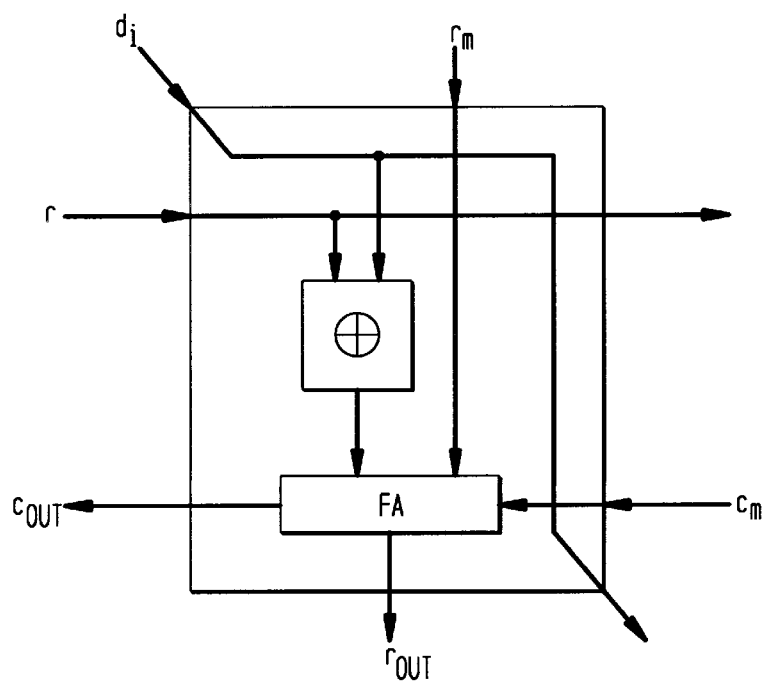
FIG. 1B illustrates a controlled add/subtract cell of the array divider of FIG. 1A.
Figure 2:
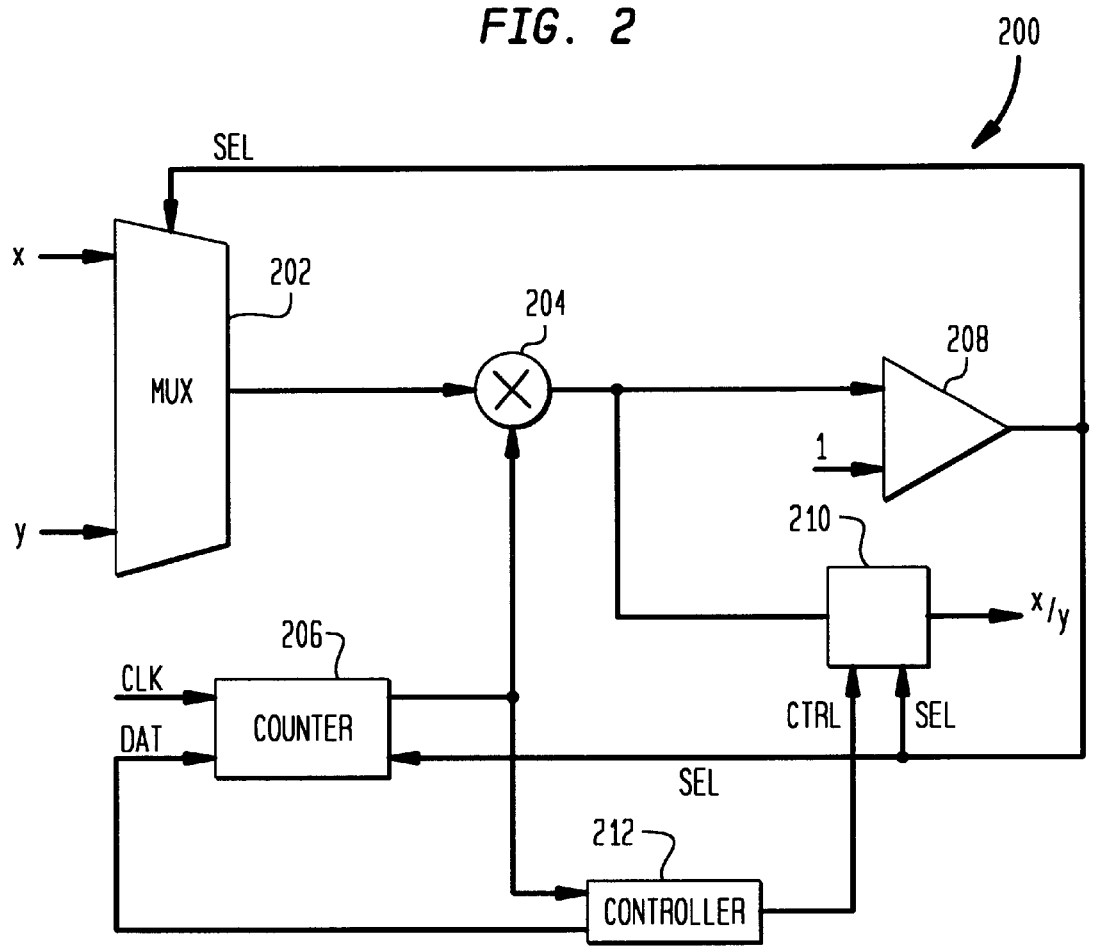
FIG. 2 shows an exemplary embodiment of the present invention having a single multiplier.

FIG. 2 shows an exemplary embodiment of a divider circuit 200 having a single multiplier in accordance with the present invention. As shown in FIG. 2, the divider circuit 200 includes a mux 202, multiplier 204, counter 206, comparator 208, and buffer 210. The divider circuit 200 may also include a controller 212 that may coordinate data transfer operations. Mux 202 receives the two values x and y, and provides a desired value of x or y in accordance with a select signal SEL. Initially, counter 206 is loaded with an initial value of DAT, which may be, for example, a zero dataword. Output select signal SEL of comparator 208 initially causes mux 202 to provide the value of y, buffer 210 to provide a previous or null output value, and counter 206 to be enabled.

Multiplier 204 multiplies the value of y from mux 202 with the counter value from the counter 206. The product of y and the counter value is compared with a threshold corresponding to a unity level, such a "1" level, in comparator 208, and the result of the compare operation of comparator 208 is provided as the select signal SEL. Comparator 208 may be a low-to-high comparator or a high-to-low comparator, and the output select signal SEL changes state when the unity level of "1" is crossed by the signal provided from the multiplier 204. Since SEL enables counter 206, each clock transition of counter clock signal CLK increments the counter value, if counter 206 is an up counter, or decrements the counter value, if counter 206 is a down counter.

When the pact of the current value of counter 206 with the value y from mux 202 crosses the unity level as determined by comparator 208, the select signal SEL changes state. When SEL changes state, mux 202 provides the value of x and no longer provides the value y. Also, when SEL changes state, counter 206 is disabled, freezing the current value of the counter having the approximate value of 1/y. Consequently, multiplier 204 multiplies the value x from mux 202 with the approximate value 1/y from the counter 206 to provide the value x/y.

The value of x/y is desirably provided to other circuit elements of an IC when the value is known to be valid. Consequently, a preferred embodiment of the present invention includes the buffer 210, which is enabled so as to provide the value x/y at a predetermined time. The value x/y from multiplier 204 is provided to the input terminal of buffer 210. When the select signal SEL changes state and CTRL has a predetermined value, the value of x/y is provided at the output terminal of buffer 210. The signal CTRL may either be a data transfer signal provided from the controller 212 or may simply be a clock transition of the data clock signal.

For the divider circuit 200 of the exemplary embodiment, as would be apparent to one skilled in the art, a process of determining x/y desirably occurs within a period that is faster than data operations of, for example, the IC. For one case, the counter clock frequency CLK is chosen such that all possible counter values may occur within a period of one or more predetermined data operations. For this case, a data operation is assumed to have a data clock signal period much greater than the period of counter clock signal CLK. Also, the counter 206 provides finite counter values, but the value of 1/y may not be a finite number, so the counter value of counter 206 corresponding to the value of 1/y is an approximation with an accuracy chosen by the designer. Consequently, the period of counter clock signal CLK may then be determined by the period of the data clock period divided by the total possible number of counter values. For example, counter 206 having eight-bit accuracy may have $2^8$ possible values, and if a data clock has a frequency of, for example, 1 kilohertz (kHz), the counter clock frequency of CLK may as a result be $2^8$ kHz.

Alternatively, for embodiments that desirably determine and immediately provide the value for x/y, the controller 212 may have a priori information as to an approximate counter value corresponding to 1/y. For such a case, an initial estimated value may first be loaded as DAT into counter 206, and a search, such as a zig-zag search, may then be accomplished. Such search may sequentially increment and decrement values of the counter 206 at a progressively greater distance from the initial estimated value until the counter value corresponding to 1/y is determined. For such alternative cases, the control section may also control the counter clock signal CLK.

Figure 3:
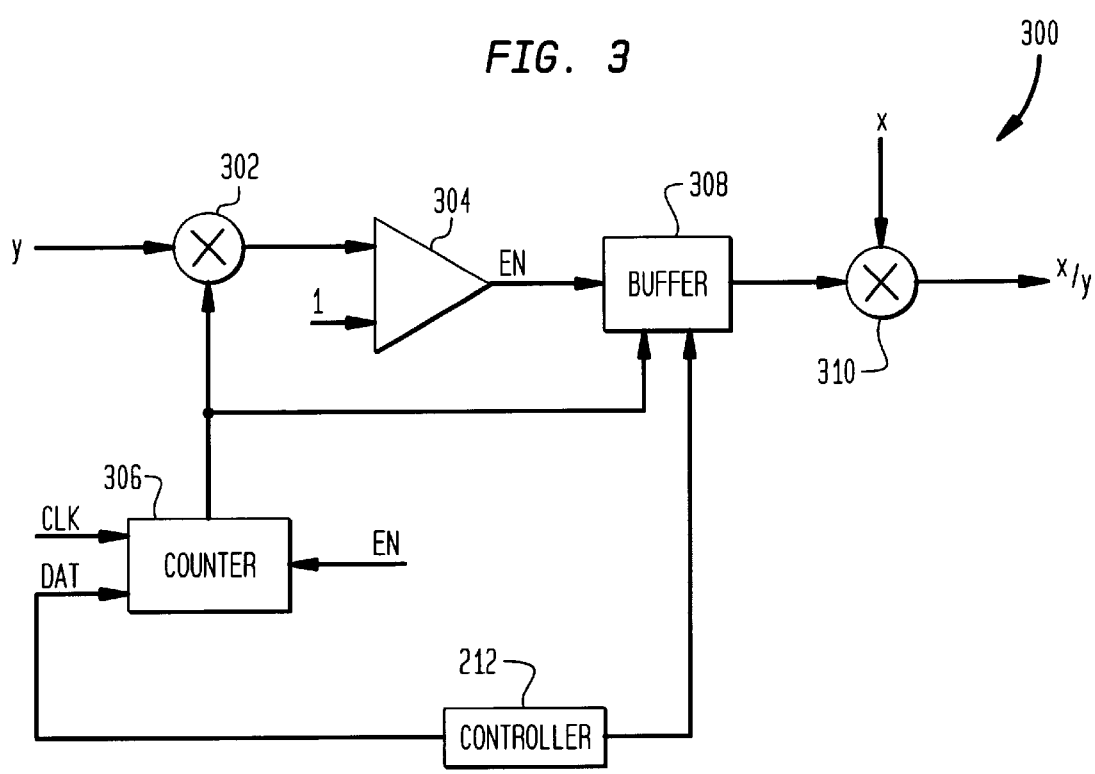
FIG. 3 shows an alternative embodiment of the present invention having two multipliers.

FIG. 3 shows an alternative embodiment of a divider circuit 300 having two multipliers in accordance with the present invention. As shown in FIG. 3, the divider circuit 300 includes a first multiplier 302, counter 306, comparator 304, buffer 308 and second multiplier 310. First multiplier 302 receives the value of y. Initially, counter 306 is loaded with an initial value of DAT, which may be, for example, a zero dataword. Output select signal EN of comparator 304 initially causes buffer 308 to provide a previous or null output value, and enables counter 306.

The value of y is multiplied with the counter value by first multiplier 302. The product of y and the counter value is compared with a threshold corresponding to the unity level by comparator 304, and the result of the compare operation of comparator 304 is provided as the select signal EN. Since EN enables counter 306, each clock transition of counter clock signal CLK increments the counter value, if counter 306 is an up counter, or decrements the counter value, if counter 306 is a down counter. When the product of the current value of counter 306 with the value y from first multiplier 302 crosses the unity level as determined by comparator 304, the select signal EN changes state. When EN changes state, counter 306 is disabled, freezing the current value of the counter having the value 1/y, and the buffer 308 is enabled to provide the current value of the counter 306 to second multiplier 310. Consequently, multiplier 310 multiplies the value x with the current value of the counter 206 approximately equivalent to 1/y to provide the value x/y.

While the exemplary embodiments of the present invention have been described with respect to circuits, the present invention is not so limited. As would be apparent to one skilled in the art, various functions of the circuit elements may also be implemented in the digital domain as processing steps in a software program. Such software may be employed in, for example, a digital signal processor, microcontroller or general purpose computer. For example, the counting operation, comparing and multiplying operations may all be implemented as software routines.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An integrated circuit having a divider circuit for dividing a value x by a value y comprising:

a counter, the counter providing a sequence of counter values;

a multiplier multiplying each of the sequence of counter values with the value y to provide a respective product value; and a comparator which compares each respective product value to a threshold to detect when the product value crosses a unity level, wherein the counter sets a selected value when the comparator detects the product value crossing the unity level, and the multiplier multiplies the selected value with the value x to provide a value corresponding to x divided by y.

2. The divider circuit as recited in claim 1, wherein the counter sets the selected value to a value present in the counter either just before or just after the respective product value crosses the unity level.

3. The divider circuit as recited in claim 1, wherein:

the comparator provides a select signal that changes between first and second states when the respective product value crosses the unity level;

the counter sequentially provides counter values in accordance with a counter clock signal when the select signal is in a first state and the selected value when the select signal is in a second state; and wherein the counter sets the selected value when the select signal transitions from the first state to the second state and the multiplier multiplies the selected value with the value x when the select signal is in the second state.

4. The divider circuit as recited in claim 3, further comprising a mux coupled to the multiplier and receiving the value x and the value y, the mux providing the value of y to the multiplier when the select signal is in the first state and the value x to the multiplier when the select signal is in the second state.

5. The divider circuit as recited in claim 3, further comprising a buffer coupled to the multiplier, the buffer providing the value of x divided by y in accordance with a control signal when the select signal is in the second state.

6. The divider circuit as recited in claim 3, further comprising a controller coupled to the counter, the controller providing an initial value for the counter and varying the sequential counter values in accordance with a control signal provided to the counter when the select signal is in the first state.

7. A divider circuit for dividing a value x by a value y comprising:

a counter, the counter providing a sequence of counter values;

a first multiplier multiplying each of the sequence of counter values with the value y to provide a respective product value; and a comparator comparing each respective product value to a threshold to detect when the product value crosses a unity level and providing a select signal that changes between first and second states when the respective product value crosses the unity level, wherein the counter sequentially provides counter values in accordance with a counter clock signal when the select signal is in a first state and a selected value when the select signal is in a second state, and the counter sets the selected value when the comparator detects the product value crossing the unity level, and a buffer, coupled to the counter and a second multiplier, providing the selected value to the second multiplier when the select signal is in the second state; and wherein the second multiplier multiplies the selected value provided by the buffer to provide the value of x divided by y.

8. The divider circuit as recited in claim 7, further comprising a controller coupled to the counter, the controller providing a value for the counter to vary the sequential counter values when the select signal is in the first state.

9. A method of providing a divide operation for values x and y comprising the steps of:
   a) providing a sequence of counter values with a counter;
   b) multiplying each of the sequence of counter values with the value y to provide a respective product value;
   c) comparing each product value with a unity threshold level,
   d) setting a selected value of the counter when the product value crosses the unity threshold level, and
   e) multiplying x by the selected value to provide a value of x divided by y.

10. The method of providing a divide operation as recited in claim 9, wherein the setting step d) sets the selected value to one of the sequence of counter values occurring either just before or just after the respective product value crosses the unity threshold level.

11. The method of providing a divide operation as recited in claim 9, wherein the multiplying step b) further includes the steps of
   b1) selecting, for sequentially multiplying, one of the sequence of counter values as an initial counter value based on the value of y; and
   b2) alternately selecting, for sequentially multiplying, additional ones of the sequence of counter values from a set of counter values occurring before the initial counter value and a set of counter values occurring after the initial counter value.

12. The method of providing a divide operation as recited in claim 9, further comprising the step f) of buffering, until a transition of a data clock signal, the value of x divided by y provide by the multiplying step e).

13. A divider circuit for dividing a value y comprising:
   counting means for providing a sequence of counter values;
   multiplying means for multiplying each of the sequence of counter values with the value y to provide a respective product value; and
   comparing means for comparing each respective product value to a unity threshold level,
   wherein the counting means sets a selected value when the comparing means detects the product value crossing the unity threshold level, and the multiplying means multiplies the selected value with the value x to provide a value corresponding to x divided by y.

14. The divider circuit as recited in claim 13, wherein the comparing means provides a select signal that changes between first and second states when the respective product value crosses the unity level.

15. The divider circuit as recited in claim 14, further comprising control means, coupled to the counting means, for providing one of the sequence of counter values as an initial value to the counting means and for varying values of the sequence of counter values provided by the counting means in accordance with a control signal provided to the counting means when the select signal is in the first state.

16. The divider circuit as recited in claim 14, further comprising mux means, coupled to the multiplying means, for receiving the value x and the value y and for providing the value of y to the multiplying means when the select signal is in the first state and the value x to the multiplying means when the select signal is in the second state.

17. The divider circuit as recited in claim 14, further comprising buffer means, coupled to the multiplying means, for buffering and then providing the value of x divided by y in accordance with a data clock signal when the select signal is in the second state.

18. An integrated circuit having a circuit for inverting a value y comprising:
   a counter, the counter providing a sequence of counter values;
   at least one multiplier multiplying each of the sequence of counter values with the value y to provide a respective product value; and
   a comparator which compares each respective product value to a threshold to detect when the product value crosses a unity level,
   wherein the counter sets a selected value when the comparator detects the product value crossing the unity level, the selected value provide corresponding to one divided by y.

* * * * *